UNITED STATES PATENT OFFICE.

ROBERT BALMER, OF TORONTO, ONTARIO, CANADA.

PROCESS FOR THE PRODUCTION OF FERTILIZERS.

1,408,064.  Specification of Letters Patent.  Patented Feb. 28, 1922.

No Drawing. Application filed September 24, 1919, Serial No. 325,960. Renewed December 24, 1921. Serial No. 524,741.

*To all whom it may concern:*

Be it known that I, ROBERT BALMER, a subject of the King of the United Kingdom of Great Britain and Ireland, and a citizen of the Dominion of Canada, and a resident of the city of Toronto, in the Province of Ontario, in said Dominion, am the inventor or discoverer of certain new and useful Improvements in Processes for the Production of Fertilizers, of which the following is a description.

My invention consists in the discovery that the ash derived from the incineration of refuse when mixed in the manner hereinafter described with excrementitious matter in alternate layers of proper thickness and subjected to treatment with moisture and heat produces a composition of manure especially valuable as an agricultural fertilizer.

My invention has for its object the utilization, first, of the wastes resulting as ash from the cremation of garbage, and second, of the nitrogenous wastes obtained from animal excrement. As the garbage ash has a substantial content of carbonate of potassium and phosphoric acid, and as the animal excrement, including in the term sewage sludge as well as dung, is rich in nitrogenous compounds, it is the object of my invention so to combine the two that a new product is obtained valuable as an intensive fertilizer, because of the blend of nitrates and phosphates characterizing it. A further object of my invention is so to combine these ingredients that the offensive odors of the excrementitious matters are destroyed.

In attaining these objects I have devised a process consisting in the building up of a bed in a storage bin by alternating layers of ash from a refuse destructor with layers of nitrogenous wastes, such as animal excrement, particularly stable manure or street sweepings or sewage sludge or a mixture thereof, and superposing a top layer of fresh ash thereon. This bed so composed, may be left to the action of the elements for its impregnation with moisture and consequent mixing of its alternate layers, or may be and preferably is subjected to injections of steam and hot air to accelerate the reactions. In treating the bed with moisture and heat, I prefer to alternate the injections of steam and hot air, applying each for a limited time, varied in accordance with the quantity of the bed and the quality of the nitrogenous waste, until the volatile nitrogenous elements are fixed and a stable compound is formed with the potash elements of the ash. This resultant fertilizer is free from offensive odors and may be transported in bulk unobjectionably.

In practicing this process, I employ equal parts of ash and nitrogenous wastes. For a batch of one ton of each, assuming the nitrogenous ingredient to be stable manure, I treat the mixture with steam from 212° F. to 230° F., for thirty minutes, and then with air heated to temperatures ranging between 180° F. and 200° F., for from two to three hours, and continue this alternation for from twenty-four to thirty-six hours. The layers of ingredients should be from ten to twelve inches deep for the nitrogenous material and eight to ten for the ash.

The resultant product is a fertilizer or manure rich in chemical ingredients required by intensive agriculture. In addition to the potash and phosphoric compounds mentioned and the potential nitrates formed, the ash itself contains mineral compounds beneficial to most soils and which are absent from the materials, such as sand, usually employed to give body to chemical and other artificial fertilizers.

Having thus described my invention as a product and the processes of producing same in the best manner now known to me, but without intending to be understood as limiting the scope of the claims by the particular methods described for the production of said product, I claim:

1. The process of producing an agricultural fertilizer consisting in building up a bed composed of alternate layers of ash resulting from the incineration of refuse and of nitrogenous wastes and steaming same.

2. The process of producing an agricultural fertilizer consisting in superposing a layer of garbage ash upon a layer of nitrogenous waste and applying preheated moisture thereto.

3. The process of producing an agricultural fertilizer consisting in applying moisture to a bed composed of alternate layers of garbage ash and nitrogenous waste and heating same.

4. The process of producing an agricultural fertilizer consisting in building up a bed composed of alternated thin layers of garbage ash and nitrogenous wastes and applying moisture and heat alternately thereto.

5. The process of producing a composition of matter for use as manure consisting in depositing in alternate thin layers ash resultant from the incineration of refuse and animal excrement, the topmost layer being of ash, and alternately applying moisture and heat therethrough.

ROBERT BALMER.